United States Patent [19]
Clapham

[11] 3,721,072
[45] March 20, 1973

[54] BONDED ACTIVATED CARBON AIR FILTER

[75] Inventor: Thomas Miller Clapham, Pittsburgh, Pa.

[73] Assignee: Calgon Corporation, Pittsburgh, Pa.

[22] Filed: July 13, 1970

[21] Appl. No.: 54,307

[52] U.S. Cl. ..........................55/387, 55/514, 55/524
[51] Int. Cl. ..............................................B01d 53/02
[58] Field of Search ..55/74, 387, 514, 524; 210/502, 210/506, 510

[56] References Cited

UNITED STATES PATENTS

| | | |
|---|---|---|
| 3,217,715 | 11/1965 | Beyer et al. ...........................55/387 |
| 3,474,600 | 10/1969 | Tobias....................................55/524 |
| 2,019,213 | 10/1935 | Dahlmah................................55/514 |
| 2,973,828 | 3/1961 | Engle .....................................55/387 |
| 3,082,481 | 3/1963 | Hinde et al.............................55/387 |

*Primary Examiner*—Charles N. Hart
*Attorney*—William L. Krayer and Herbert J. Zeh, Jr.

[57] ABSTRACT

A filter for removing odors, hydrocarbons, and other contaminants from air comprising activated carbon granules bonded together into a monolithic extended surface shape in the form of a wave. This type of filter is particularly useful in air handling systems where pressure drop is critical.

8 Claims, 3 Drawing Figures

PATENTED MAR 20 1973 3,721,072

INVENTOR.
THOMAS M. CLAPHAM
BY
William L. Krayer
ATTORNEY.

BONDED ACTIVATED CARBON AIR FILTER

BACKGROUND OF THE INVENTION

It is well known in the art to use activated carbon to remove undesired odors, noxious fumes, hydrocarbons, organic contaminants and the like from air and other gas streams. Originally, the activated carbon was used in its granular form since that form facilitated reactivation and because there was no good process for bonding the carbon granules into shapes known in the art. The loose granular carbon had little or no design flexibility for filter shapes. However, more recently, granular activated carbon has been bonded and molded into various shapes suitable for adsorbing the various types of contaminants from gases. For example, see U.S. Pat. No. 3,474,600 which is directed to bonded carbon articles and see, also, my copending application Ser. No. 1,772, filed Jan. 9, 1970, now U.S. Pat. No. 3,645,072 which is directed to a bonded activated carbon filter and a method of making the same.

Unfortunately, most of the molded shapes of the prior art have serious drawbacks. Many of the shapes are subject to erosion or attrition with a subsequent loss in adsorption capacity. Most of the shapes have a high pressure drop and are therefore precluded or severely limited in their use in air purification systems such as those employed in industrial, home and automotive heating and air conditioning systems. In addition, the shapes of the prior art do not have sufficient adsorption efficiency for a given flow rate and pressure drop.

Therefore, it is an object of the present invention to provide novel bonded activated carbon shapes which do not suffer from the drawbacks of the prior art.

SUMMARY OF THE INVENTION

I have invented an improved bonded activated carbon filter which is easy to make and use. The bonded activated carbon filter of my invention does not form dust or show a loss of capacity from erosion or attrition. The filter is easy to handle and shows a minimum pressure drop without having to by-pass air. In addition, the improved filter of this invention has a maximum adsorption removal efficiency for a given flow rate and allowable pressure drop. The filter may be cast in a single piece and does not take up a large amount of space.

The bonded activated carbon filter of my invention is a monolithic extended surface shape in the form of a wave. My filter will be more particularly described and better understood with reference to the accompanying drawings wherein.

Figure 1:
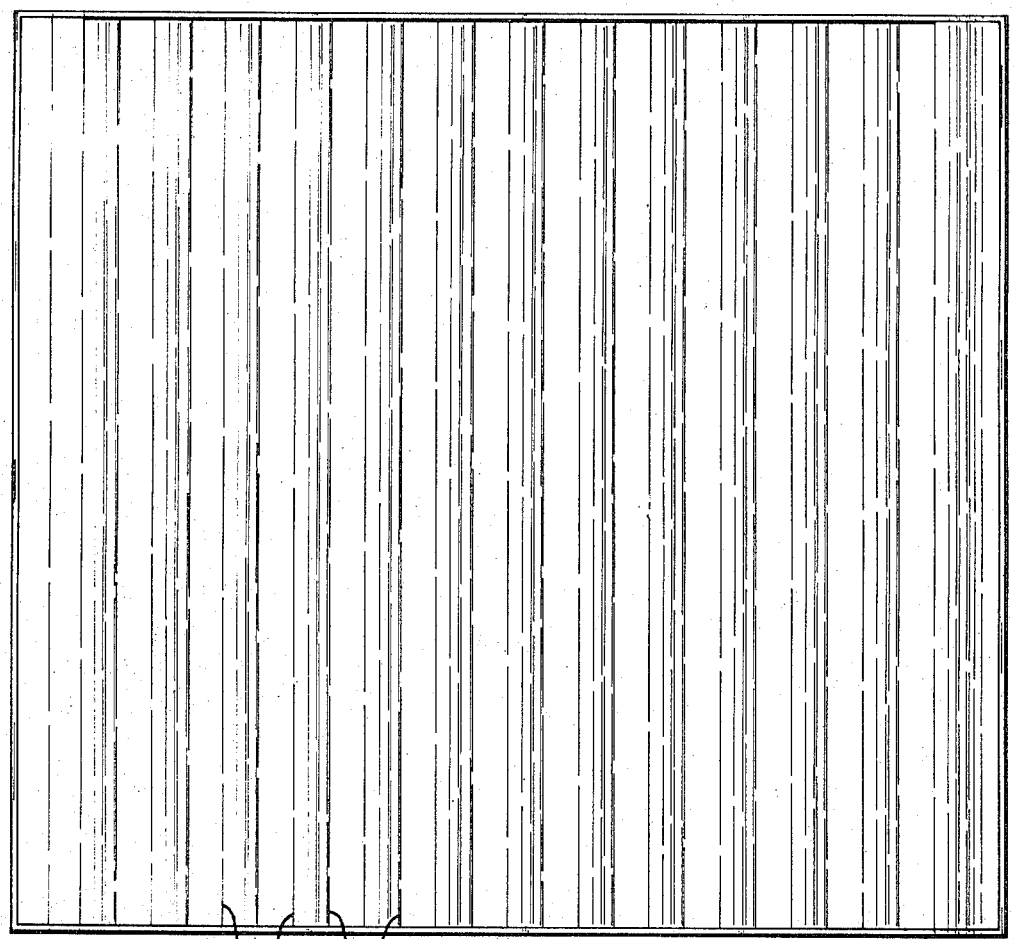
FIG. 1 is a top view looking down on a filter of my invention.

In FIG. 1 the entire filter is shown to be enclosed by a rigid or semi- rigid frame 1. The wave shape of the filter is shown by the alternating peaks 2 and troughs 4.

Figure 2:
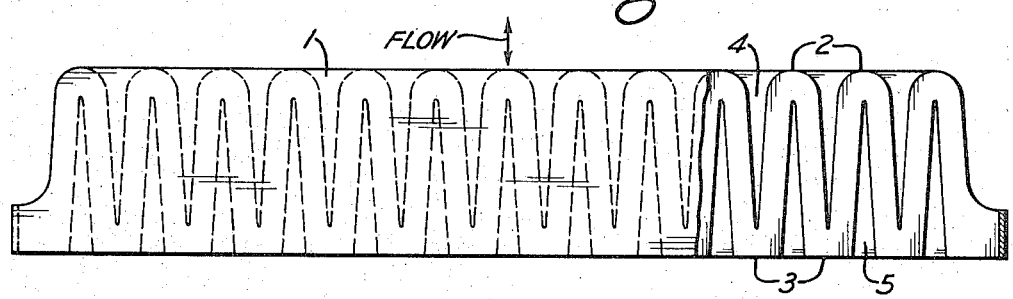
FIG. 2 is a side view showing a face of my filter.

In FIG. 2, a side view of the filter is shown with the frame 1 removed from a part of the filter face. The wave shape of the filter is clearly shown by the alternating peaks 2 and troughs 4. The bottom of the troughs are flattened out to form a base as shown by 3 and the wave form is symmetrical as shown by 3 and the clefts 5. The gas to be purified has two possible flow directions as shown by the directional arrow. When the gas is flowing in a downwardly direction, 2 represents peaks and 4 represents troughs and 3 represents the base and 5 the clefts. When the gas is flowing in an upwardly direction 3 represents peaks and 5 represents troughs and 4 represents clefts.

Figure 3:
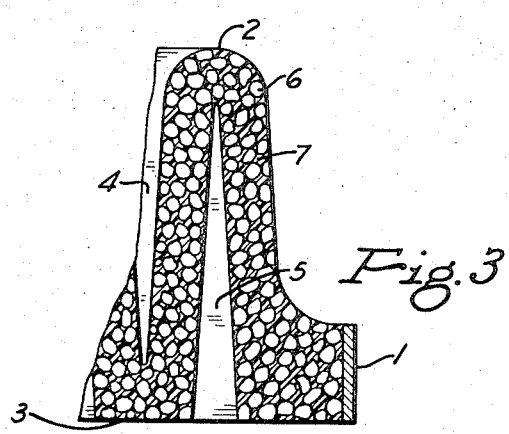
FIG. 3 is an enlarged sectional view showing an end wave of my filter.

In FIG. 3, the enlarged sectional view of an end wave shows the frame 1 attached to the edge of the filter. The granules of activated carbon 6 are shown to be bonded together by the bonding material 7. The ratio of bonding material to carbon is exaggerated by this view and the bonding material is not continuous as shown but there are many open spaces. In addition, the view also shows the peaks 2 or 3 and troughs 4 or 5.

The filter of my invention in addition to being supported by a rigid or semi- rigid frame may be wrapped in a suitable non-woven fiber such as asbestos, cotton, fiber glass, wire wool, or one of the various synthetics. The preferred material for wrapping is non-woven acrylic filter media such as DYNEL. This optional wrapping improves the filter by helping to remove the particulate contaminants from the gas streams.

The wave-shaped filter of this invention may also have a filter body which has a final form other than rectangular. The filter may be formed in a triangle, a hexagon, an octagon, a circle or any other form which is necessary in order for the filter to fit into an air duct. For example, some automotive and industrial heating and air conditioning systems require a rectangular filter body while other units require a circular filter body. The important feature of my filter is not the form of the filter body but the extended wave-shaped surface. So long as the filter has a wave-shaped surface the final geometric form of the filter body is optional.

The frame of the filter may be of any rigid or semi-rigid material. Some examples of useful framing materials are metal, glass, wood, plastic, paperboard and the like. In addition, the frame at the ends of the filter may be cast of bonded carbon integral to the filter. The frame may be attached to the filter by utilizing the same bonding agent which bonds the carbon granules together or else it may be attached by using any other suitable adhesive. The use of a frame is entirely optional and is not necessary in practicing my invention. However, I prefer to use at least a semi-rigid frame of paperboard to give the filter good dimensional stability.

The wave-shaped surface of my filter may be modified to a certain degree. For instance, the peaks and/or troughs of the wave may be flattened out. It is desirable for some uses to have the peaks and/or troughs flattened out in order for the filter to have a base and be stable in the filter container. In addition, it is somewhat easier to mold the filter when the peaks and/or troughs are slightly flat.

The wavelength of the filter surface may also be varied. The desired wavelength will depend on factors such as the ultimate size of the filter, the thickness of the carbon layer, the size of the carbon granules, the allowed pressure drop, the necessary flow rate, the amount of carbon necessary to remove the undesirable contaminants and other factors which are readily apparent to one skilled in the art. I have found that for most applications a wavelength of at least three-eighths inch is desirable.

In addition to the wavelength of the filter, the thickness of the bonded carbon may be varied. The thickness of the bonded carbon is dependent on the factors enumerated above for the variance of the wavelength. I have found that for most applications a minimum thickness of one-fourth inch of bonded carbon is desirable. The bonded carbon may optionally contain a reinforcing device such as a wire mesh screen embedded into it. However, for most practical applications, the reinforcement is not necessary.

I have found that there are many bonding materials which may be used in my filter. Generally speaking, the bonding materials include thermoplastic, thermosetting and solvent responsive materials. The preferred bonding agents are the thermoplastics, particularly polyethylene. The polyethylene may be mixed with the granular activated carbon in the manner described by Tobias in U.S. Pat. No. 3,474,600. Other thermoplastic resins include monoolefin polymers such as polypropylene, polybutylene, polyamylene, poly 2-methyl amylene, ethylene copolymers with monoolefins have three to 10 carbon atoms, e.g., ethylene-propylene copolymer (9:1 or 1:1 or 1:9 on a molar basis for example), ethylene-butylene copolymer (9:1 on a molar basis), ethylene-decene copolymer (95:5 on a weight basis) or copolymers of propylene with higher monoolefins, e.g., propylene-amylene copolymer (9:1 on a weight basis). Thermosetting resins such as acrylics or methacrylics may be used in the manner described by Lloyd in U.S. Pat. application Ser. No. 662,589, filed Aug. 23, 1967 now U.S. Pat. No. 3,544,507. Preferred thermosetting resins are water emulsion acrylics. The thermosetting water insoluble vinylidene polymer is a copolymer of 2 to 20 (preferably 2 to 10) parts of acrylamide or methacrylamide or methylol or methoxymethyl acrylamide or methacrylamide with 80 to 98 parts of at least one monomer of the group of lower alkyl esters of acrylic acid and methacrylic acid, styrene, p-methyl styrene, o-methyl styrene, m-methyl styrene and acrylonitrile. Examples of alkyl acrylates and methacrylates are methyl acrylate, ethyl acrylate, propyl acrylate, isopropyl acrylate, butyl acrylate, hexyl acrylate, heptyl acrylate, n-octyl acrylate, 2-ethylhexyl acrylate, isooctyl acrylate and the corresponding esters of methacrylic acid, e.g., methyl methacrylate, ethyl methacrylate, butyl methacrylate and n-octyl methacrylate.

The preferred vinylidene compound polymer is a copolymer of acrylamide (or methacrylamide), an acrylate ester and a methacrylate ester, most preferably a copolymer of 2 to 10 percent acrylamide and 98 to 90 percent of a mixture of 1 to 3 parts of ethyl acrylate with 1 part of methyl methacrylate, e.g., a copolymer of ethyl acrylate and methyl methacrylate in a ratio of 1:1 or 2:1.

As the water soluble thermosetting aminoplast there can be used the methylol derivatives of urea, thiourea, guanidine, cyclic ethylene urea, cyclic propylene urea, cyclic ethylene thiourea, melamine, trimethyl melamine and other alkyl melamines, triphenyl melamine and other aryl melamines, formoguanamine, acetoguanamine, benzoguanamine and other alkyl and aryl guanamines as well as other aminotriazines as set forth in Wedmer U.S. Pat. No. 2,197,357. The preferred aminoplasts are urea and melamine-formaldehyde reaction products including dimethylol urea, sesquimethylol urea, di, tri, tetra, penta or hexamethylol melamine. Most preferably the urea or melamine-formaldehyde condensation product is modified with a lower alkanol such as methyl alcohol or ethyl alcohol. Examples of such products are dimethoxymethyl urea, trimethylol melamine trimethyl ether, pentamethylol melamine tetramethyl ether, pentamethylol-melamine pentamethyl ether, N,N' bis(methoxymethyl) uron, pentamethylol melamine trimethyl ether.

Specific examples of vinylidene copolymers which are suitable are:

1. a terpolymer made from 180 parts of ethyl acrylate, 222 parts of methyl methacrylate and 21.2 parts of methacrylamide;
2. a terpolymer of 210 parts 2-ethylhexyl acrylate, 573 parts methyl methacrylate and 40 parts methacrylamide;
3. a polymer of 330 parts of ethyl acrylate, 330 parts of vinyl toluene, 15 parts of methoxymethyl methacrylamide and 15 parts of acrylamide;
4. a terpolymer of 440 parts of ethyl acrylate, 340 parts methyl methacrylate, and 37 parts of acrylamide;
5. a polymer made of 440 parts ethyl acrylate, 340 parts methyl acrylate and 37 parts acrylamide further reacted with 100 parts of styrene;
6. a polymer of 89 parts of ethyl acrylate, 110 parts methyl methacrylate, 5.25 parts methacrylamide and 5.75 parts of methylol methacrylamide;
7. a terpolymer of 52.5 parts methyl methacrylate, 42.5 parts ethyl acrylate and 5 parts methacrylamide;
8. a terpolymer of 66 parts ethyl acrylate, 26 parts methyl methacrylate and 8 parts methacrylamide;
9. a terpolymer of 42.5 parts ethyl acrylate, 52.5 parts of styrene and 5 parts methacrylamide;
10. a terpolymer of 42.5 parts of ethyl acrylate, 26.5 parts styrene, 26.5 parts methyl methacrylate and 4.5 parts methacrylamide;
11. a terpolymer of 67 parts ethyl acrylate, 33 parts methyl methacrylate and 5 parts acrylamide.

The melamine-formaldehyde or other aminoplast can be 10 to 50 percent of the total of the vinylidene polymer and the aminoplast.

The thermosetting resin mixture is normally employed as an aqueous mixture, conveniently of 40 to 70 percent solids content, although this can be varied.

Solvent casting, preferably using polystyrene resin, may be used where there is no danger that a temporary loading of the carbon with solvent will affect performance.

It should be noted that the adsorptive capacity of the carbon is largely preserved if the bonding agent contacts each granule over a minimum surface area. Also, the pressure drop of the filter is much less when as much open space as possible is permitted between the carbon granules. For these reasons, the preferred bonding agent is in the form of small particles, and the heating or other bonding process is abbreviated so contact is made over a minimal area of the carbon. The space occupied by the bonding agent should be no greater than one-half of the empty space remaining.

The granular activated carbon may range in mesh size from 4 of 6 through 20 or 50. It normally will have a surface area of from 600 to 1,400 square meters/gram. However, other activated carbons are useful.

I claim:

1. A filter device comprising a frame and a filter body within and attached to the interior of said frame, said filter body being in a monolithic extended surface shape in the form of a wave and consisting essentially of granular activated carbon having a mesh size of from 4 to 50 and small particles of a bonding agent for bonding the carbon granules into a unitary shaped mass having open spaces between said granular activated carbon and said bonding agent, said bonding agent occupying no more than one-half the available space between the carbon granules.

2. A filter as in claim 1 wherein the monolithic extended surface shape is in the form of a sine wave.

3. A filter device as in claim 1 wherein the frame is a member selected from the group of rigid and semi-rigid materials.

4. A filter device as in claim 3 wherein the frame is a semirigid material.

5. A filter device as in claim 4 wherein the frame is paperboard.

6. A filter device as in claim 1 wherein the bonding agent is a member selected from the group consisting of thermoplastic, thermosetting and solvent responsive materials.

7. A filter device as in claim 6 wherein the bonding agent is a thermoplastic material.

8. A filter device as in claim 7 wherein the bonding agent is polyethylene.

* * * * *

Disclaimer

3,721,072.—*Thomas Miller Clapham*, Pittsburgh, Pa. BONDED ACTIVATED CARBON AIR FILTER. Patent dated Mar. 20, 1973. Disclaimer filed May 1, 1972, by the inventor, the assignee, *Calgon Corporation*, concurring.

Hereby disclaims the portion of the term of the patent subsequent to Feb. 29, 1989.

[*Official Gazette May 29, 1973.*]